(12) United States Patent
Matsuo

(10) Patent No.: US 6,826,362 B2
(45) Date of Patent: Nov. 30, 2004

(54) CAMERA HAVING DISTANCE MEASURING APPARATUS

(75) Inventor: Naoki Matsuo, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/729,352

(22) Filed: Dec. 5, 2003

(65) Prior Publication Data

US 2004/0170418 A1 Sep. 2, 2004

(30) Foreign Application Priority Data

Dec. 10, 2002 (JP) ........................................ 2002-358297
Dec. 10, 2002 (JP) ........................................ 2002-358298
Dec. 1, 2003 (JP) ........................................ 2003-402273
Dec. 1, 2003 (JP) ........................................ 2003-402274

(51) Int. Cl.[7] ............................................. G03B 13/36
(52) U.S. Cl. ........................ 396/104; 396/106; 396/123
(58) Field of Search ............................... 396/104, 106, 396/121–123

(56) References Cited

U.S. PATENT DOCUMENTS 5,940,634 A * 8/1999 Nakamura .................. 396/104

6,701,074 B2 * 3/2004 Yoshida et al. .............. 396/101
6,718,133 B2 * 4/2004 Nakata et al. ................ 396/96

FOREIGN PATENT DOCUMENTS

JP          05-040037          2/1993

* cited by examiner

*Primary Examiner*—W. B. Perkey
(74) *Attorney, Agent, or Firm*—John C. Pokotylo; Straub & Pokotylo

(57) ABSTRACT

A camera having a distance measuring apparatus according to the present invention includes a photo receiving unit receiving object images focused by photo-receiving lenses; a selecting unit selecting any one of distance-measuring area in a photographing plane; and a determining unit determining whether or not an extreme value exists in outputs from the photo receiving unit, in the distance-measuring area selected by the selecting unit. When the determining unit determines that no extreme value exists, the selecting unit selects a second distance-measuring area having outputs whose inclination orientation is opposite to that of the outputs from the photo receiving unit, in the initially-selected first distance-measuring area.

25 Claims, 13 Drawing Sheets

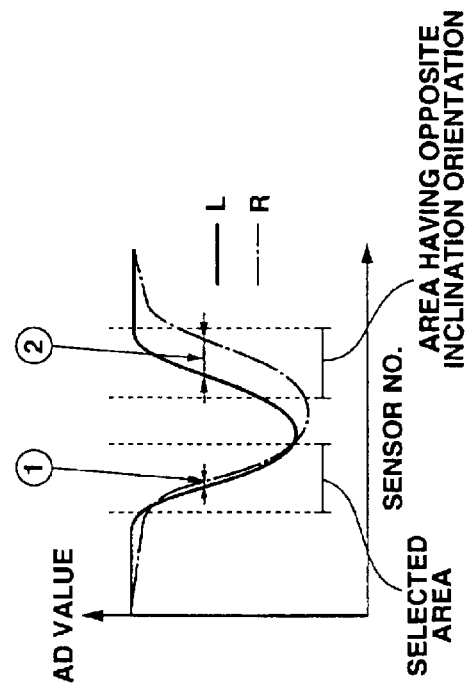
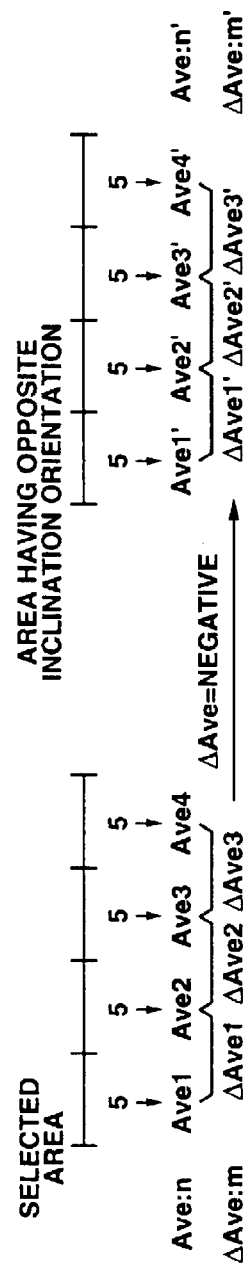

CAMERA HAVING DISTANCE MEASURING APPARATUS

CROSS-REFERENCE TO RELATED APPLICATION

The present application claims benefits of Japanese Applications No. 2002-358297 in Japan on Dec. 10, 2002, No. 2002-358298 filed in Japan on Dec. 10, 2002, No. 2003-402273 filed in Japan on Dec. 1, 2003, No. 2003-402274 filed in Japan on Dec. 1, 2003, the contents of which are incorporated by this reference.

BACKGROUND OF THE INVENTION

1. Field of the Invention

This invention relates to a camera having a distance measuring apparatus and more particularly, it relates to a camera having a distance measuring apparatus having a multi-autofocus function with which ranges of a plurality of areas in a photographing plane are found.

2. Related Art Statement

As is widely known, there are two autofocus (hereinafter, called AF) types used for the distance measuring of a camera: one is a "passive type" in which an AF sensor disposed in the main body of a camera directly receives an image signal (optical image), the other is an "active type" in which a camera projects distance measuring fill light toward an object and receives its reflected light.

Also, even in a passive AF camera, when an object lies in a dark-place or the contrast of an object is low, fill light is projected for lighting up the object or for making the variations of brightness and darkness larger on the object, so that a process of an active type is performed so as to improve distance measuring accuracy.

In addition, a technique with which a fixed-light removing function for removing a component of light reflected at an object other than the fill light or distance measuring light (hereinafter, the component is called fixed light) is provided so as to improve detecting accuracy of the reflected light has been also known and disclosed in Japanese Unexamined Patent Application Publication No. 5-40037.

BRIEF SUMMARY OF THE INVENTION

Briefly speaking, a camera having a distance measuring apparatus which performs distance measuring of a plurality of distance measuring areas in a photographing plane, according to the present invention, includes a photo-receiving lens, each forming an object image; a photo receiving unit receiving the object image formed by the photo-receiving lens; a computing unit computing data about object-to-camera distances on the plurality of distance measuring areas on the basis of outputs of the photo receiving unit; a selecting unit selecting any one of the distance measuring areas in the photographing plane on the basis of the computed results of the computing unit; and a determining unit determining whether or not an extreme value exists in outputs of the photo receiving unit, in the distance measuring area selected by the selecting unit, and when the determining unit determines that the extreme value does not exist, the selecting unit selects a second distance measuring area different from the initially-selected first distance measuring area.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE DRAWINGS

FIG. 6A is a diagram illustrating a method for preventing a distance longer or shorter than an actual distance from being computed when output values of sensor data have no extreme value;

FIG. 6B is a diagram illustrating the method for preventing a distance longer or shorter than an actual distance from being computed when the output values of the sensor data have no extreme value;

DETAILED DESCRIPTION OF THE PREFERRED EMBODIMENTS

First of all, a first embodiment will be described.

Figure 1:
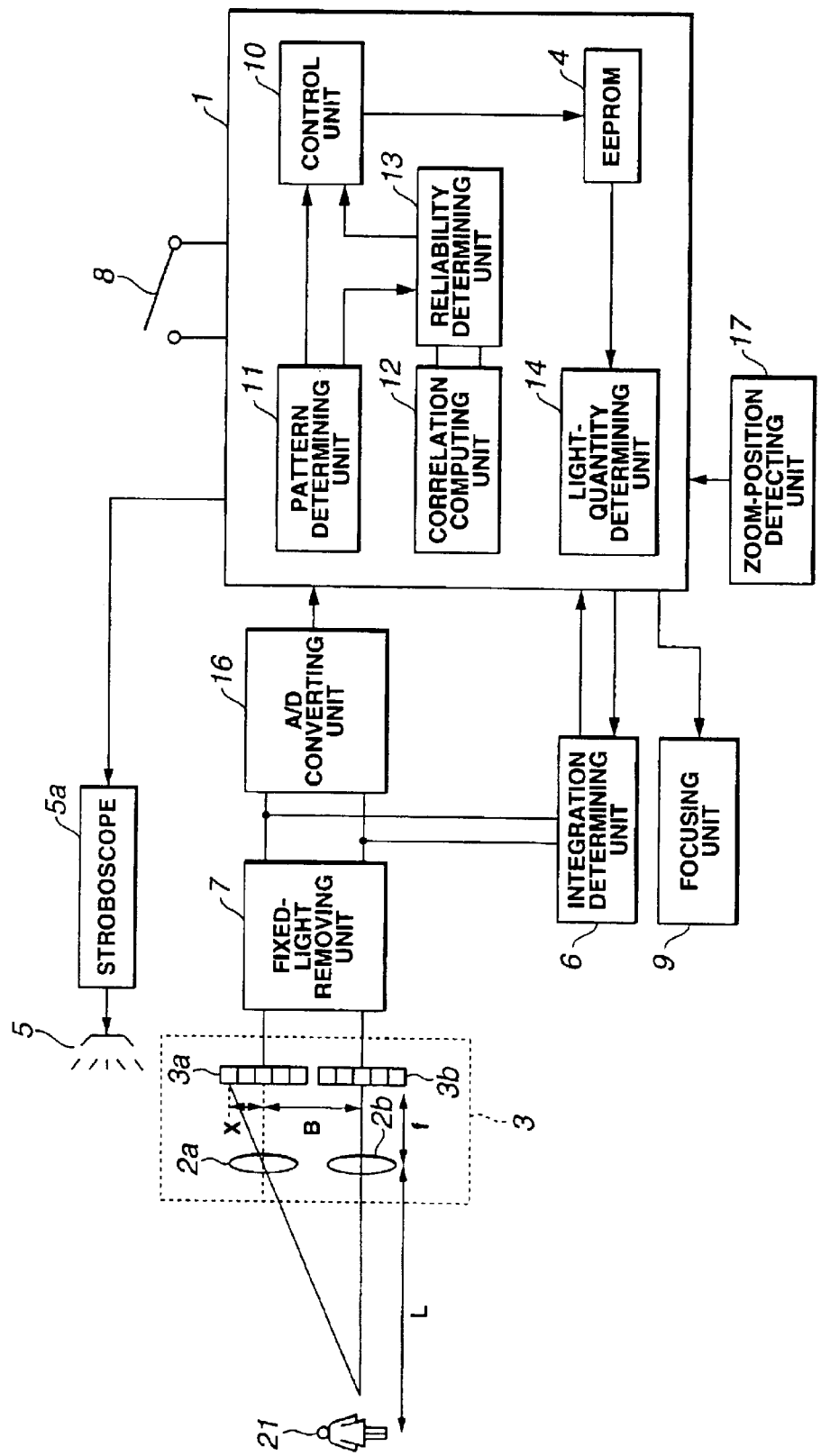
FIG. 1 is a block diagram illustrating the general structure of an entire electrical circuit of a camera having a distance measuring apparatus according to a first embodiment of the present invention.

FIG. 1 is a block diagram illustrating the general structure of an electrical circuit of a camera having a distance measuring apparatus according to the first embodiment of the present invention.

The camera is an autofocus camera and also has a zoom mechanism for changing a focal distance of its photographing optical system.

As shown in FIG. 1, the camera having a distance measuring apparatus has an arithmetic control circuit (hereinafter, called CPU) 1 disposed therein, constituted of an one-chip microcomputer and the like, for controlling an overall operational sequence of the camera in accordance with a switching operation by an operator. Connected to the CPU 1 are a stroboscope 5a having an electronic flash unit 5 for flashing stroboscopic light toward an object; an integration determining unit 6; a release switch 8 for starting a shooting sequence of the camera; a focusing unit 9 controlling a focusing operation of the photographing optical system (not shown); an A/D converting unit (converter) 16 converting integrated outputs of image signals from a pair of sensor arrays 3a and 3b, which will be described later, into digital signals; and a zoom-position detecting unit 17.

Also, the pair of sensor arrays 3a and 3b have a fixed-light removing unit 7 connected to the output terminals thereof, and the fixed-light removing unit 7 has the integration determining unit 6 and the A/D converting unit 16 connected to the output terminals thereof. The pair of sensor arrays 3a and 3b are respectively formed by a sensor array containing juxtaposing pixels used for photo receptors and constitutes an AF sensor 3 which is disposed so as to face an object 21 of which distance is measured and which has a pair of photo-receiving lenses 2a and 2b and an integration circuit (not shown).

The CPU 1 has an EEPROM 4 serving as a nonvolatile storage for storing parameters needed for controlling a camera operation and an operating state of the camera, a control unit 10 responsible for controlling the entire camera, a pattern determining unit 11, a correlation computing unit 12, a reliability determining unit 13, and a light-quantity determining unit 14. The pattern determining unit 11 is connected to the control unit 10 and reliability determining unit 13, the reliability determining unit 13 is connected to the control unit 10 and the correlation computing unit 12, the control unit 10 is connected to the EEPROM 4, and the EEPROM 4 is connected to the light-quantity determining unit 14.

The AF sensor 3 detects a camera-to-object distance L extending from the camera to the object 21. Images of the object 21 obtained through a pair of the photo-receiving lenses 2a and 2b disposed away from each other by a base length (parallax) B are formed on the pair of sensor arrays 3a and 3b disposed at a position of a focal distance f, and the camera-to-object distance L is detected by the CPU 1 on the basis of a difference x in image positions with respect to the parallax by using the known triangulation principle.

Relative positions, with respect to the optical axes of the photo-receiving lenses 2a and 2b, of the images of the object 21 formed on the pair of sensor arrays 3a and 3b vary in accordance with the magnitude of the camera-to-object distance L detected as described above.

In order to detect the relative positions, the A/D converting unit 16 converts integrated outputs (here, an integration circuit is included in each pixel of the sensor arrays 3a and 3b) constituting image signals of the object from the sensor arrays 3a and 3b, into digital signals and outputs them to the CPU 1. The CPU 1 compares digital image signals of the sensor array 3a and 3b outputted from the A/D converting unit 16 to each other so that the relative positional difference and camera-to-object distance are detected.

With the above comparison by the CPU 1, the digital image signals detected by the pair of sensor arrays 3a and 3b are checked whether or not these signals are generated from the same object 21. In the CPU 1, the pattern determining unit 11 determines whether or not patterns of the digital image signals are appropriate for distance measuring, and the correlation computing unit 12 detects a relative positional difference of images from the digital image signals.

On the basis of the coincidence level of the images upon detecting the relative positions or on the basis of results of pattern determination of the images, if the images have low contrast, repetitive patterns, monotonously increasing patterns, or monotonously decreasing patterns, the reliability determining unit 13 determines that reliability of the distance measuring is low. Also, when removing fixed light, the electronic flash unit 5 projects distance-measuring light onto the object 21 so as to be reflected thereat so that the light-quantity determining unit 14 determines quantities of light incident on the pair of sensor arrays 3a and 3b.

The focusing unit 9 decides a control amount of a focusing operation of the photographing optical system on the basis of these determined results in the CPU 1. Also, the CPU 1 determines a variety of camera manipulations, such as a turn-on operation of the release switch 8 performed by an operator, in order to control a picture-taking operation, and in addition, also when distance-measuring, the CPU 1 controls the stroboscope 5a if needed so as to cause the electronic flash unit 5 to flash light appropriately.

Meanwhile, the integration determining unit 6 determines whether or not the integral values reach predetermined values on the basis of the integrated outputs from the pair of sensor arrays 3a and 3b.

In the event of the distance measuring, the fixed-light removing unit 7 removes a light component originating in fixed light such as sunlight or artificial illumination illuminating an object. Outputs of the fixed-light removing unit 7 and the light-quantity determining unit 14 determining the brightness of an object are compared with a constant read out from the EEPROM 4, and a pulse width of distance-measuring light during the distance measuring is determined in accordance with the magnitudes of the constant. Also, the fixed-light removing unit 7 determines the brightness of the object on the basis of the output results of the sensor arrays 3a and 3b when projecting the distance-measuring light.

Figures 2A, 2B:
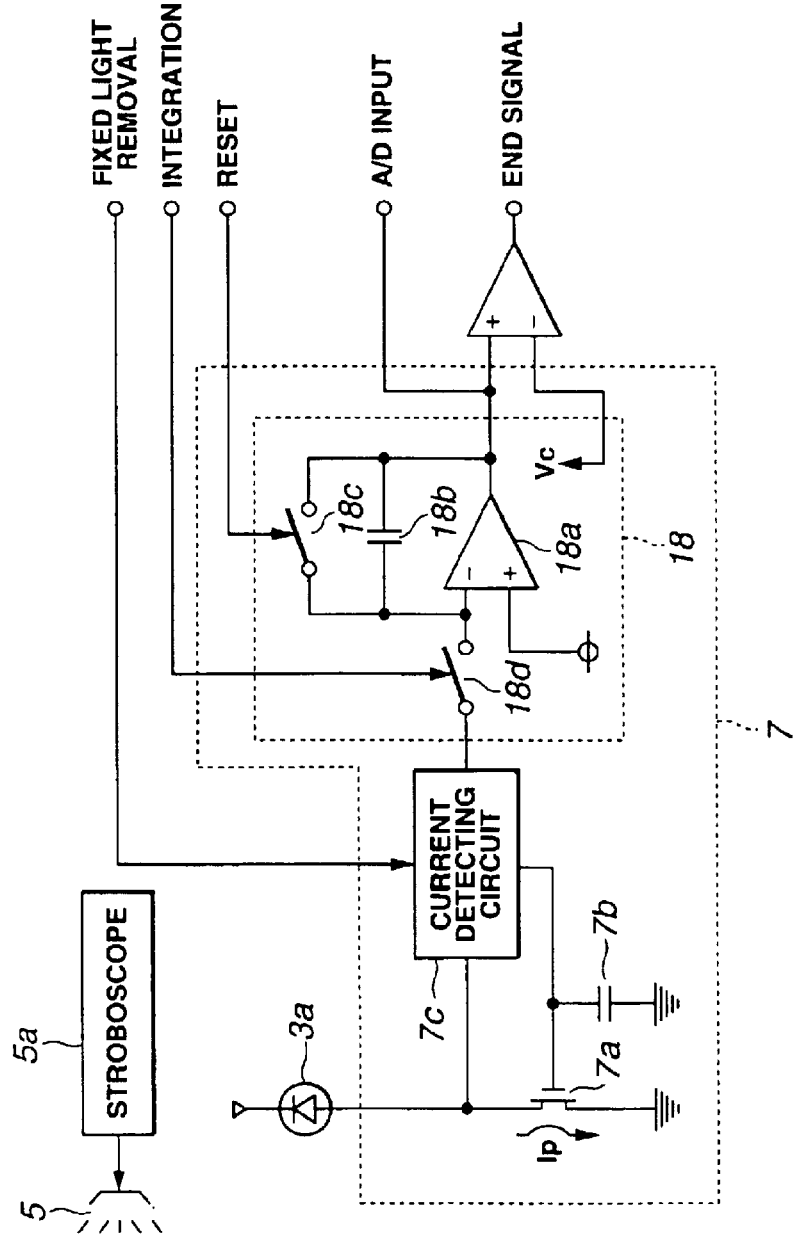
FIG. 2A is an electrical circuit diagram illustrating the structure of a fixed-light removing unit of the camera according to the first embodiment.
FIG. 2B is a timing chart of the fixed-light removing unit of the camera according to the first embodiment.

Next, a circuit constituting the fixed-light removing unit 7, formed in association with each of the pixels constituting, for example, the sensor array 3a shown in the FIG. 1, and its operation will be described. FIG. 2A is an electrical circuit diagram illustrating the structure and a timing chart of the fixed-light removing unit 7.

As shown in FIG. 2A, in the fixed-light removing unit 7, a serial circuit formed by the sensor array 3a and a fixed-light removing transistor 7a and a holding capacitor 7b are connected to a current detecting circuit 7c, and the output terminal of the current detecting circuit 7c is connected to an integration amplifier 18a having a reset switch 18d interposed therebetween. An integration circuit 18 is formed by the integration amplifier 18a and a parallel circuit formed by an integration capacitor 18b and a reset switch 18c, both connected between the output and input terminals of the amplifier 18a.

A photoelectric current Ip outputted from the sensor array 3a is passed to a GND (ground) via the fixed-light removing transistor 7a in accordance with the quantity of light incident on the sensor array 3a. In this state, the current detecting circuit 7c controls a gate voltage of the fixed-light removing transistor 7a so as to prevent a current from passing through the integration circuit 18 formed by the integration amplifier 18a, the integration capacitor 18b, the reset switches 18c and 18d, and the like.

The holding capacitor 7b is disposed so as to fix the gate voltage at a certain value. In this fixed state, for example, when the stroboscope 5a causes the electronic flash unit 5 to flash light so as to project distance-measuring light in a pulsed manner toward the object 21 (see FIG. 1), and also the current detecting circuit 7c is set in a non-operative mode, the voltage across both ends of the holding capacitor 7b is irresponsive to a sharp pulsed change of the distance-measuring light. In this state, when the reset switch 18d is being turned on, only the photoelectric current Ip in accordance with the pulse light is inputted into the integration circuit 18, and thus a photoelectric conversion voltage based on the distance-measuring light is outputted from the output terminal of the integration amplifier 18a. Thus, when this output is subjected to A/D conversion, data of a quantity of reflected light in accordance with reflected signal light is detected.

Also, in order to determine whether a picture-taking scene is bright or dark, the current detecting circuit 7c is set in a non-operative mode. Then, as shown in FIG. 2B, after the reset switch 18c is temporarily turned on, the fixed-light current Ip is passed into the integration circuit 18, and an integrated voltage Vc integrated for a predetermined time period tINT is measured and is stored in the EEPROM 4 (see FIG. 1). With this arrangement, since Vc is generally low in a bright scene and high in a dark scene, a bright/dark determination can be made by measuring the level of the integrated voltage Vc.

Figure 3B:
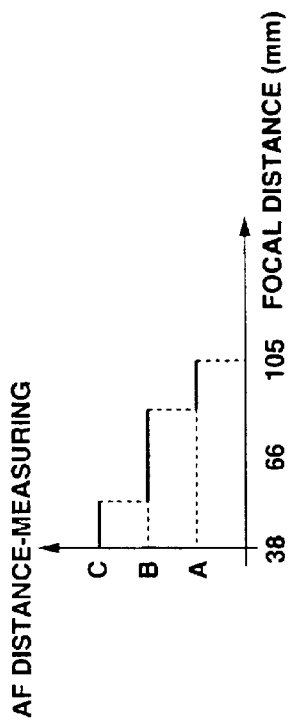
FIG. 3B is a diagram illustrating the relationship between AF distance-measuring range and focal distance at each zoom position of the camera according to the first embodiment.
Figure 3A:
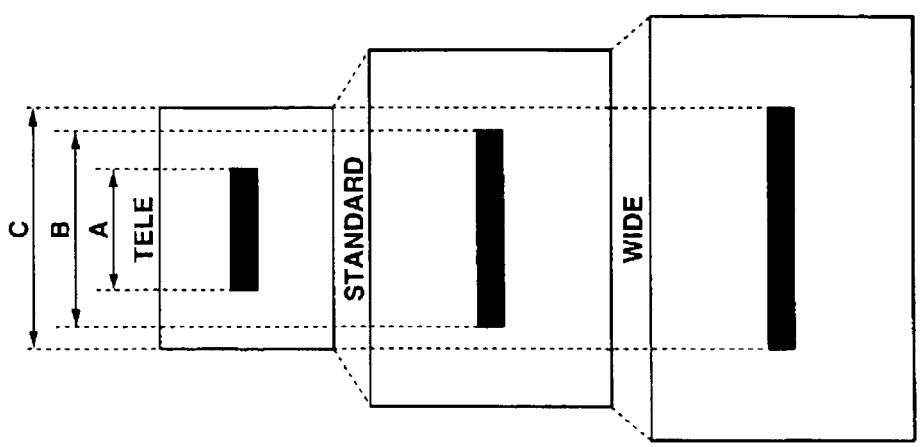
FIG. 3A is a schematic view of an AF distance-measuring range at each zoom position of the camera according to the first embodiment.

FIG. 3A illustrates an AF distance-measuring range varying in conjunction with a focal distance of a taking lens.

As shown in FIG. 3A, an angle of field of the taking lens (not shown) is generally widened (TELE→WIDE) as the focal distance decreases (comes closer to the wide angle side). In this state, when an angle of AF view of each of the photo-receiving lenses 2a and 2b (see FIG. 1) remains constant, since the ratio of the angle of AF view to the, angle of field of the taking lens decreases, an object lying in the periphery of the photographing plane of the taking lens falls out of focus.

To prevent the above problem, the camera having a distance measuring apparatus according to the present embodiment has a structure in which, in order to keep the ratio of a distance-measuring angle to an angle of picture field constant in accordance with the detected result of the focal distance of the zoom-position detecting unit 17 (see FIG. 1), the distance-measuring range is changed in three steps of A, B, and C by using information concerning the focal distance stored in the EEPROM 4 (see FIG. 1) such that the number of pixels to be effective, serving as photo receptors of the pair of sensor arrays 3a and 3b increase as the focal distance comes closer to the wide angle side.

FIG. 3B shows the information concerning the focal distance stored in the EEPROM 4, illustrating a manner of changing the distance-measuring ranges by using the relationship between focal distance and AF distance-measuring range.

As described above, even when the focal distance is changed by the zoom mechanism, and the angle of picture field is thus widened, the ratio of the distance-measuring angle to the angle of picture field can be kept constant by changing the AF distance-measuring range in conjunction with the focal distance.

Next, a phenomenon that stroboscopic light flashed by the electronic flash unit 5 toward the object has an influence on the AF sensor 3 will be described with reference to a schematic view of a major part of the camera in FIG. 4 and diagrams in FIGS. 5A to 5C.

Figure 4:
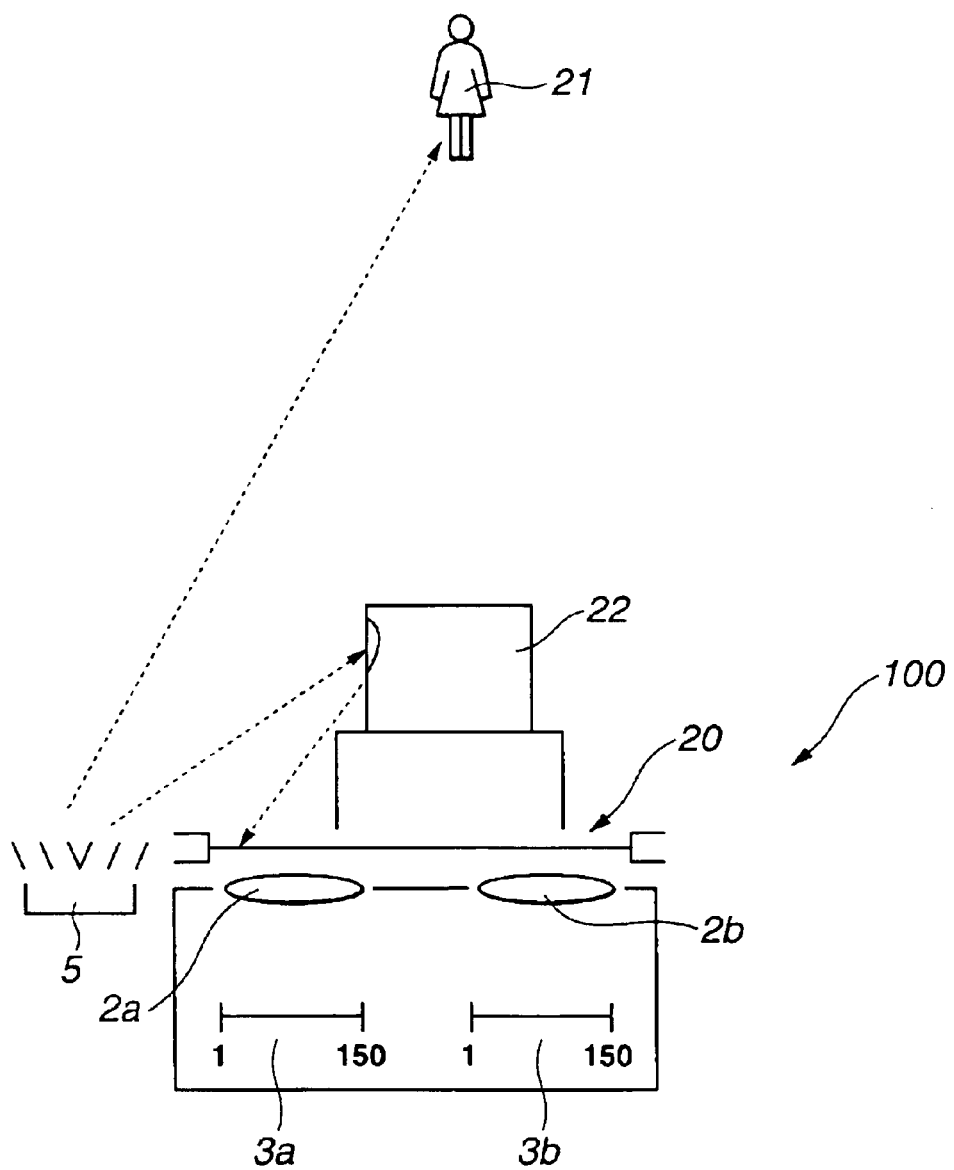
FIG. 4 is a schematic view of a major part of the camera according to the first embodiment, illustrating incident light for distance measuring.

As shown in FIG. 4, the camera having a distance measuring apparatus 100 according to the present invention has the electronic flash unit 5, a front panel 20, a taking lens barrel 22, the pair of photo-receiving lenses 2a and 2b, and the pair of sensor arrays 3a and 3b, and as shown in FIG. 1, the fixed-light removing unit 7, the A/D conversion unit 16, and so forth are connected to the pair of sensor arrays 3a and 3b.

Figure 5A:
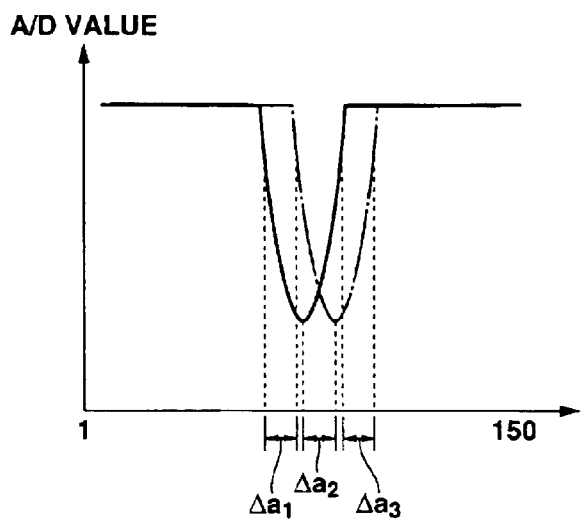
FIG. 5A is a diagram illustrating a phenomenon that stroboscopic light flashed by an electronic flash unit of the camera according to the first embodiment toward an object has an influence on the AF sensor.

In the camera having the above-described structure, when fill light is projected from the electronic flash unit 5 so as to measure a distance to the object 21, by converting integrated outputs from the sensor arrays 3a and 3b into digital signals by the A/D converting unit 16, image signals as shown in FIG. 5A are generally obtained. Then, when their correlations are computed by the correlation computing unit 12 (see FIG. 1), a relative positional difference of images is computed, and the camera-to-object distance L is thus computed.

However, when the stroboscope is flashed, for example, as shown in FIG. 4, a part of stroboscopic light from the electronic flash unit 5 is reflected at the surface of the lens barrel 22 and is incident on the end surface of the front panel 20, and its fixed light incident on the end surface of the front panel 20 is diffusively reflected thereat and glistens in a flare-like manner, thereby being incident on the sensor array 3a.

Figure 5B:
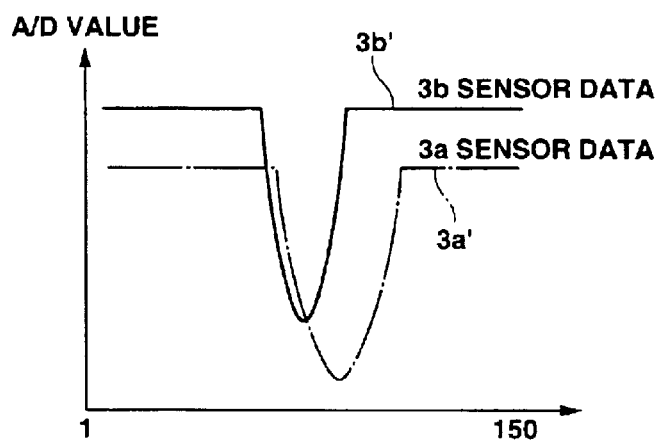
FIG. 5B is a diagram illustrating the phenomenon that stroboscopic light flashed by the electronic flash unit of the camera according to the first embodiment toward an object has an influence on the AF sensor.

In such a case, as shown in FIG. 5B, a difference in integration levels of an image signal 3a' outputted from the sensor array 3a on which the above light is incident and an image signal 3b' outputted from the sensor array 3b on which the above light is not incident is generated, resulting that only the sensor array 3a is influenced by the phenomenon that the front panel 20 is glistening in a flare-like manner.

A difference in the integration levels can be corrected, for example, by computing a difference in average values of respective all sensor data of the sensor arrays 3a and 3b. However, when the front panel 20 glistens in a flare-like manner, the sensor data is sometimes deformed as shown in FIG. 5C. In that case, even when its correlation is computed by the correlation computing unit 12, the computed correlation may result in a wrong one.

The reason of this is explained as follows. In the case shown in FIG. 5A, the correlation results of all Δa1, Δa2, and Δa3 are unchanged. However, in the case shown in FIG. 5C, although the correlation result of Δc2 serving as an extreme value is the same as that of Δa2, Δa1 and Δc1 have a relationship of Δa1>Δc1, thereby resulting in computing a longer distance than the actual camera-to-object distance L in the case shown in FIG. 5C, and also Δa3 and Δc3 have a relationship of Δa1<Δc3, thereby resulting in computing a shorter distance than the actual camera-to-object distance L in the case shown in FIG. 5C.

Figure 5C:
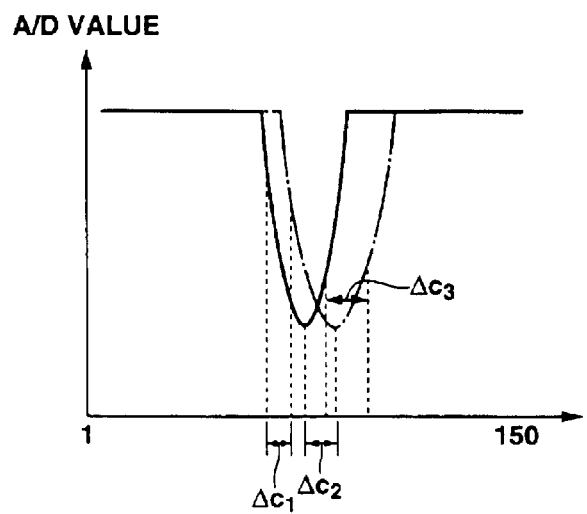
FIG. 5C is a diagram illustrating the phenomenon that stroboscopic light flashed by the electronic flash unit of the camera according to the first embodiment toward an object has an influence on the AF sensor.

Each of the diagrams in FIGS. 5A to 5C illustrates sensor data obtained when distance measuring is performed in a typical picture-taking scene where fill light is effective, and to be more specific, for example, a scene where there is a figure with a background of a night scene is assumed.

In such a picture-taking scene, the reason why the sensor data as shown in FIG. 5A is obtained, as described above, is such that light coming from the night scene is removed as fixed light by the fixed-light removing unit 7, (see FIG. 1), and only data coming from fill light flashed from the electronic flash unit 5, which is reflected at the figure and is then incident on the pair of sensor arrays 3a and 3b, is reflected in the sensor data.

Meanwhile, also in the case of FIG. 5B, although the fill light reflected at the lens barrel 22 (see FIG. 4) is incident on the sensor array 3a as shown in FIG. 4, the reason why the sensor data in this case is not the same as that shown in FIG. 5A is such that, since light glistening in a flare-like manner on the front panel 20 is incident on the sensor array 3a as described above, the light has an influence on the sensor data of the sensor array 3a, thereby causing an integration of the sensor data of the sensor array 3a to be advanced as a whole.

Next, when no extreme value exists in a range used for computing a distance of the sensor data, a method for preventing computing a distance longer or shorter than an actual distance as shown in FIG. 5C will be described with reference to a diagram in FIG. 6A.

This method is achieved by utilizing a feature as follows: In the case where the sensor data of the sensor array 3a is deformed (its integration is advanced as a whole) due to the flare-like glistening of the front panel 20 (see FIG. 4) as shown in the FIG. 5C, further if no extreme value exists in a selected distance-measuring area and its distance-measured result is shifted to the long distance side, distance-measured results in another distance-measuring area having no extreme value and whose inclination orientation is opposite to that of the selected distance-measuring area whose distance-measured result is shifted to the long distance side is shifted to the short distance side.

To be more specific, as shown in FIG. 6A, an integration of the whole sensor data of the sensor array 3a is advanced due to an influence of the above-described fill light. Concerning the sensor data shown in FIG. 6A, when the reciprocal 1/L (1) of its distance is computed by computing its correlation with respect to the selected distance-measuring area, it is shifted to the long distance side if no correction is applied.

With this having in mind, in the case where, for example, 20 sensors are used in the selected distance-measuring area as shown in FIG. 6B, an average value Ave;n (n=1, 2, 3, 4) of the sensor data of every 5 sensors is computed, and in addition, a difference ΔAve;m (m=1, 2, 3) between two of the average values is computed. When all values of ΔAve;m are negative, it is found that the sensor data of the selected distance-measuring area has no extreme value and the distance-measured value decreases.

Then, a distance-measuring area having sensor data whose inclination orientation is opposite to that of the sensor data of the selected distance-measuring area is searched for. In the same fashion as in the selected distance-measuring area, an average value Ave;n' (n'=1, 2, 3, 4) of the sensor data of every 5 sensors is computed, and a difference ΔAve;ml (m'=1, 2, 3) between two of the average values is computed. When all values of ΔAve;m' are positive, it is determined that the sensor data in the searched distance-measuring area has an opposite inclination orientation.

With this arrangement, the reciprocals 1/L (2) of the searched distance-measuring area having the opposite inclination orientation is computed, and then, an average value of the 1/L (1) and 1/L (2) is computed, so that the distance-measured result is prevented from being shifted to the long distance side.

Meanwhile, when there is a plurality of distance-measuring areas having an opposite inclination orientation, the distance-measuring area closest to the selected distance-measuring area having an extreme value therebetween is selected. Also, concerning the searching direction of the distance-measuring areas having an opposite inclination orientation, an extreme value is searched for in the direction along which a sensor number becomes larger or smaller when all ΔAve;m are negative or positive, respectively.

Next, a correcting-operation control of the CPU 1 in the case where digital values outputted from the sensor arrays 3a and 3b and transformed are influenced by fill light reflected at the surface of the lens barrel 22, and hence a level difference of the digital values is generated between the sensor arrays, will be described with reference to flowcharts in FIG. 7 and other figures.

Meanwhile, a mode in which distance measuring is performed by using a relative positional difference of image signals of an object of which distance is measured without projection of distance-measuring fill light is called "passive mode", and a mode in which distance measuring is performed by using a relative positional difference of image signals of an object of which distance is measured with removal of the fixed light and with projection of distance-measuring fill light such as stroboscopic light is called "active mode".

Figure 7:
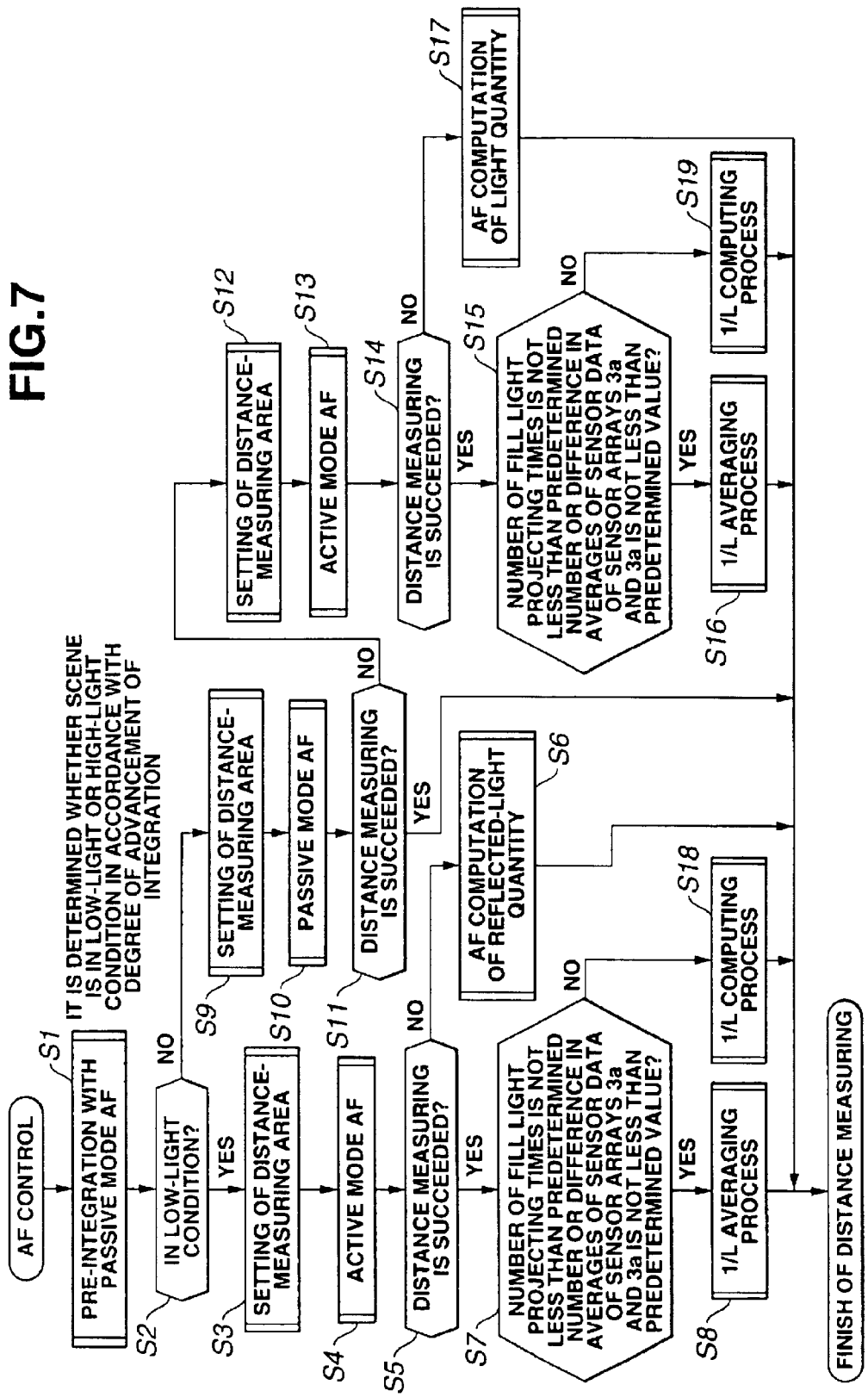
FIG. 7 is a flowchart illustrating a distance-measuring control (AF control) by a CPU of the camera according to the first embodiment.

FIG. 7 is a main flowchart illustrating a distance-measuring control (AF control) of the CPU 1.

As shown in FIG. 7, first of all, in Step S1, distance measuring is performed in the passive mode without projecting distance-measuring fill light, a pre-integration is then executed with the pair of sensor arrays 3a and 3b for a given time period, and the process moves to Step S2.

In Step S2, it is determined whether a picture-taking scene is in a low-level brightness or high-level brightness condition in accordance with a degree of advancement of the pre-integration executed in Step S1. When the picture-taking scene is in a low-level brightness condition, the process moves to Step S3, and when the picture-taking scene is in a high-level brightness condition, the process branches to Step S9.

When the picture-taking scene is in a low-level brightness condition, in Step S3, a distance-measuring area of an object is set in conjunction with its focal distance (see FIGS. 3A and 11), and the process moves to Step S4. In Step S4, the distance measuring is performed in the active mode in which the distance measuring is performed with projection of the above-described distance-measuring fill light, a first distance-measuring area is selected (see FIG. 9A), and the process moves to Step S5.

It is determined in Step S5 whether or not the distance measuring performed in the active mode in the Step S4 is succeeded. Here, the phrase "distance measuring is succeeded" is defined such that a correlation and an interpolation are computed by the correlation computing unit 12 (see FIG. 1), which is a known technology, a misaligned between images of the pair of sensor arrays 3a and 3b is computed on the basis of these results, and the known reliability determination whether or not the misaligned amount between the images is right is performed by the reliability determining unit 13. When the distance measuring in the active mode is succeeded, the process moves to Step S7. When failed, the process branches to Step S6, the distance measuring is performed with an AF computation of a quantity of reflected light, and then the distance measuring is finished. Such a ranging system is a distance measuring system utilizing a phenomenon that, when light is projected and a quantity of its reflected light is measured, a large quantity of light is reflected at an object close to a camera, and a small quantity of light is reflected at an object far away from the camera, and this system is effective for a very-low-contrast object, although it is assumed that the reflectance of the object lies in a predetermined range.

When the distance measuring is succeeded, it is determined in Step S7 whether or not the number of fill-light flashing times is not less than a predetermined number of times or a difference in average values of sensor data from the pair of sensor arrays 3a and 3b is not less than a predetermined value. When either one is not less than the corresponding predetermined value, the process moves to Step S8. In Step S8, a second-distance-measuring area having an inclination orientation opposite to that in the first distance-measuring area selected in Step S4 is searched for, 1/L (2) of the searched distance-measuring area having the opposite inclination orientation is computed, the above-described 1/L averaging process (see FIGS. 6A and 12) of computing an average value of 1/L (1) of the first distance-measuring area selected in Step S4 and 1/L (2) of the second distance-measuring area having the opposite inclination orientation is conducted, and the distance measuring is finished. When both are less than the corresponding predetermined values, the process branches to Step S18, 1/L of the distance-measuring areas is computed in Step S18 with the known closest selection, and the distance measuring is finished.

In the meantime, the reason why only the condition that the number of fill-light flashing times is not less than a predetermined number of times is set in Step S7 is such that, when the number of fill-light flashing times is small, a small number of times of reflection from the above-described lens barrel decreases and also noise decreases. Also, the reason why the averaging process, which will be described later, is performed only when a difference in the average values of the sensor data from the sensor arrays 3a and 3b is not less than the predetermined value, when the difference in the average values of the sensor data of the pair of sensor arrays 3a and 3b is small, it can be determined that the fill light reflected at the lens barrel has a small influence. However, when a further accurate control is required, the condition in Step S7 allowing the process to move to Step S8 is changed to that in which the number of fill-light flashing times is not less than the predetermined number of times and also the difference in the average values of the sensor data from the pair of sensor arrays 3a and 3b is not less than the predetermined value.

Back to Step S2, when the picture-taking scene is in a high-level brightness condition, the process branches to Step S9, a distance-measuring area of the object is set, and the process moves to Step S10. In step S10, the distance measuring is performed in the passive mode, and the process moves to Step S11.

It is determined in Step S11 whether or not the distance measuring performed in the passive mode is succeeded. When the distance measuring is succeeded, the distance measuring is finished when failed, the process branches to Step S12.

In Step S12, a distance-measuring area of the object is set again, and the process moves to Step S13. In Step S13, the distance measuring is performed again in the active mode, and the process moves to Step S14.

It is determined in Step S14 whether or not the distance measuring performed in the active mode in the Step S13 is succeeded. When the distance measuring performed in the active mode is succeeded, the process moves to Step S15. When failed, the process branches to Step S17, an AF computation of a quantity of reflected light is performed, and then the distance measuring is finished.

When the distance measuring is succeeded, it is determined in Step S15 whether or not the number of fill-light flashing times is not less than the predetermined number of times or the difference in the average values of the sensor data from the pair of sensor arrays 3a and 3b is not less than the predetermined value. When either one is not less than the corresponding predetermined value, the process moves to Step S16, the above-described 1/L averaging process is conducted, and the distance measuring is finished when both are less than the corresponding predetermined values, the process branches to Step S19, 1/L of the distance-measuring area is computed in Step S19 with the known closest selection, and the distance measuring is finished.

Next, a control of the pre-integration in the passive mode shown in the Step S1 will be described with reference to a flowchart of a subroutine in FIG. 8A.

Figure 8A:
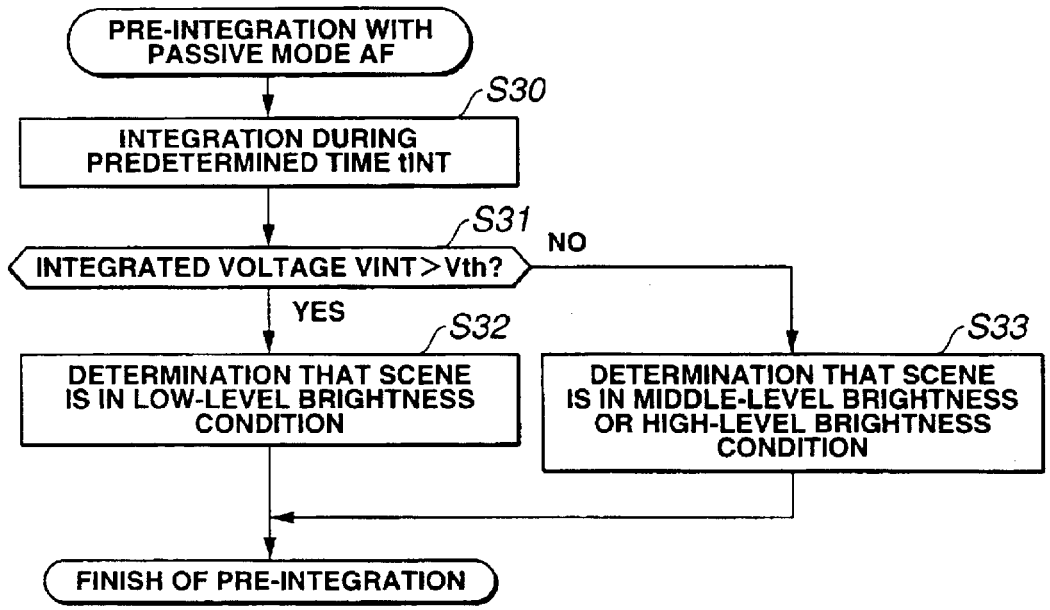
FIG. 8A is a flowchart illustrating a pre-integration control of the camera according to the first embodiment in a passive mode.
Figure 8B:
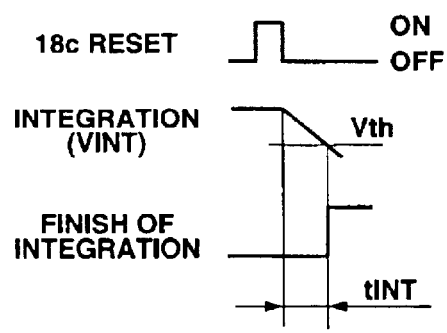
FIG. 8B is a timing chart illustrating the pre-integration control of the camera according to the first embodiment in a passive mode.

As shown in FIG. 8A, first of all, an integration is executed in Step S30 for the predetermined time period tINT. The integration is started after the resetting switch 18c (see FIG. 2A) is temporarily turned on as shown in FIG. 8B. In this state, an integrated voltage VINT during the integration is detected for the predetermined time period tINT and is stored in the EEPROM 4 (see FIG. 1) or the like. Then the process moves to Step S31.

Meanwhile, since the integrated voltage VINT is generally low in a bright picture-taking scene and high in a dark picture-taking scene, a bright/dark determination of an object can be performed by detecting the integrated voltage VINT.

Thus, in Step S31, it is determined whether the integrated voltage VINT obtained by the integration during the period of tINT in the step S30 is higher or lower than a low-level brightness determination voltage vth serving as a threshold for determining whether or not the picture-taking scene is in a low-level brightness condition. When the integrated voltage VINT is higher than the low-level brightness determination voltage vth, the process moves to Step S32, it is determined that the scene is in a low-level brightness condition, and the pre-integration is finished. When the integrated voltage VINT is lower than the low-level brightness determination voltage Vth, the process moves to Step S33, it is determined that the scene is in a middle-level brightness or high-level brightness condition, and the pre-integration is finished.

Next, a control of the integration in the active mode shown in the Steps S4 and S13 will be described with reference to a flowchart of a subroutine in FIG. 9A.

Figure 9A:
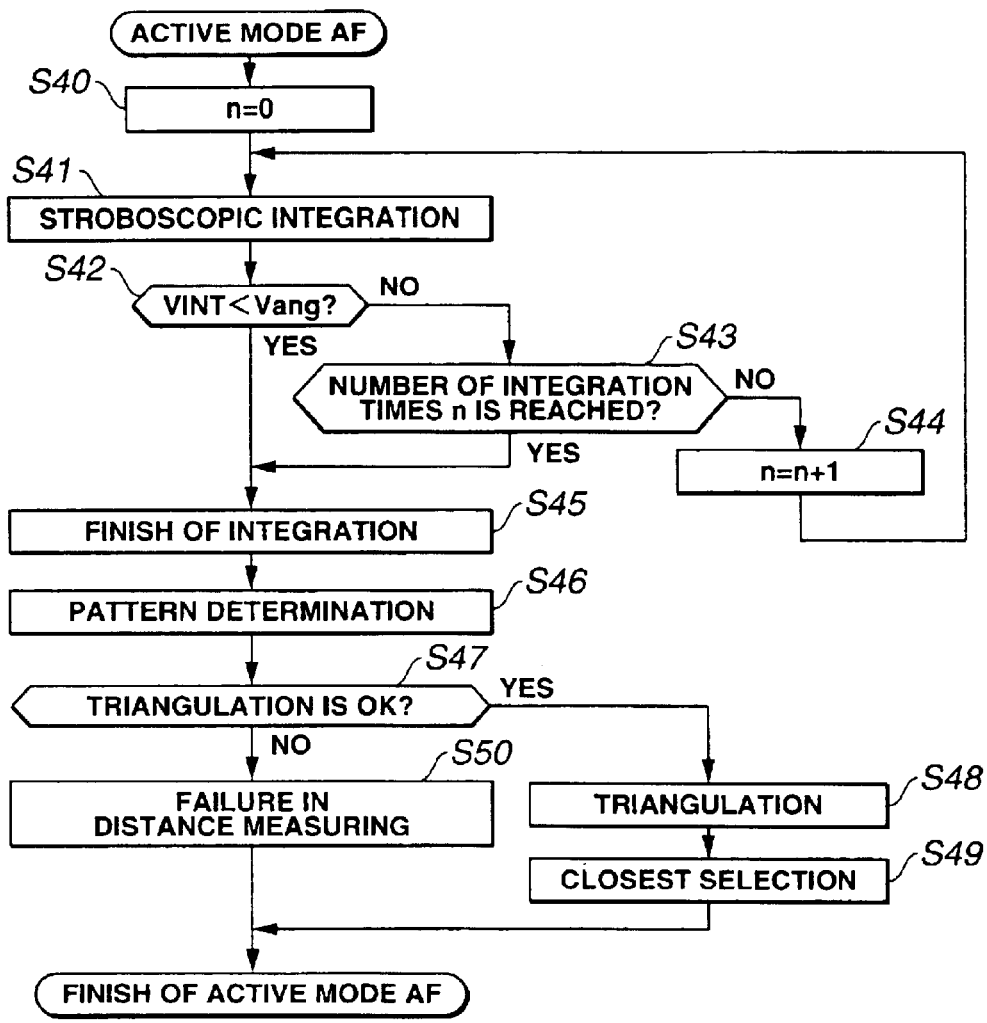
FIG. 9A is a flowchart illustrating an integration control of the camera according to the first embodiment in an active mode.
Figure 9B:
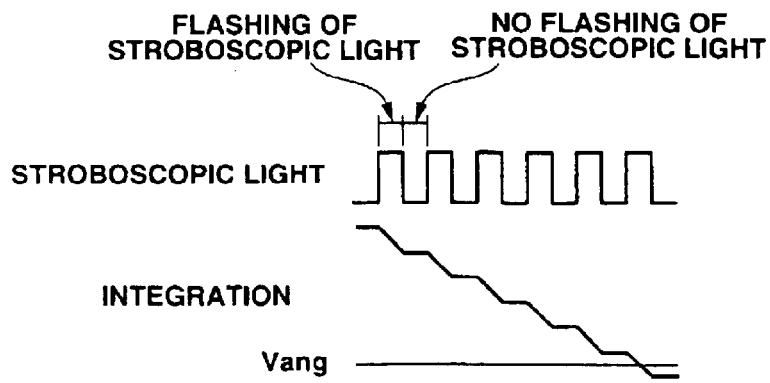
FIG. 9B is a timing chart illustrating the integration control of the camera according to the first embodiment in an active mode.

As shown in FIG. 9A, first of all, in Step S40, an integration-counting variable n is cleared, and the process moves to Step S41. Then, in Steps S41 to S45, as shown in FIG. 9B, the fill light is flashed for a predetermined time period until the integrated voltage VINT reaches a predetermined voltage Vang, and the integration by flashing is repeated.

The number of sensor arrays involved for outputting the integrated voltage VINT may be all of them or may be determined in accordance with a value stored in the EEPROM 4 (see FIG. 1). In addition, an integrated voltage of a sensor having the largest or the smallest quantity of incident light among sensors involved for outputting the integrated voltage may be selected as the integrated voltage VINT.

Also, generally the number of sensor arrays involved for outputting the integrated voltage VINT is often only one of the pair of sensor arrays since power consumption of the EEPROM 4 can be curbed, and also a control for setting sensor arrays to be involved can be simplified. However, in the case where the integrated voltage of only one of the pair of sensor arrays is selected to be outputted, if fill light has an influence on the sensor array whose sensors are not selected for outputting the integrated voltage, as shown in the above-described FIG. 6A, an A/D value of the sensor array which is not selected is sometimes saturated. In such a case, even if the A/D value level of the sensor array is corrected, since the level of coincidence of images is low, a relative phase difference varies, thereby resulting in an inaccurate distance-measured result.

Hence, the integration-finish voltage Vang in the active mode is set higher than an integration-finish voltage Vpng (see FIG. 10B) in the passive mode so as to prevent the A/D value from being saturated even when the fill light has an influence on the sensor array.

It is determined in Step S42 whether or not the integrated voltage VINT reaches the integration-finish voltage vang. When the integrated voltage VINT reaches the integration-finish voltage Vang, the process moves to Step S45, and the integration is finished. Then, the process moves to Step S46.

When the integrated voltage VINT does not reach the integration-finish voltage Vang, the process branches to Step S43, and it is determined whether or not the number of integration times reaches the predetermined number of times. If the number of integration times reaches the predetermined number of times, the process moves to Step S45. If not reaching the predetermined number of times, the process moves to Step S41, and Steps S41 to S44 are repeated until reaching the integration-finish voltage Vang. The integration by flashing executed more than the predetermined number of times causes a waste of energy and has an influence on a time lag of a distance-measuring operation and the like, whereby a limiter is set in Step S44 at an appropriate number of integration times.

In Step S46, a pattern determination is performed by the reliability determining unit 13 (see FIG. 1) taking reflected light into consideration, and the process moves to Step S47. It is determined in Step S47 whether or not triangulation is possible on the basis of the determined result in Step S46. When an image signal is a triangulation-possible reflected-light image signal, the process moves to Step S48, and the triangulation is performed. In the subsequent Step S49, the closest selection for selecting a distance-measuring area outputting the closest distance-measured result among a plurality of distance-measuring areas is performed, and the integration in the active mode is finished.

Back to Step S47, when it is determined that the triangulation is impossible, the process moves to Step S50, a distance-measuring failure determination is made, and the integration in the active mode is finished.

Next, concerning the pre-integration in the passive mode shown in FIG. 8A, an integration control in the case where it is determined that the picture-taking scene is in a middle-level brightness or high-level brightness condition will be described with reference to a flowchart of a subroutine in FIG. 10A.

Figure 10A:
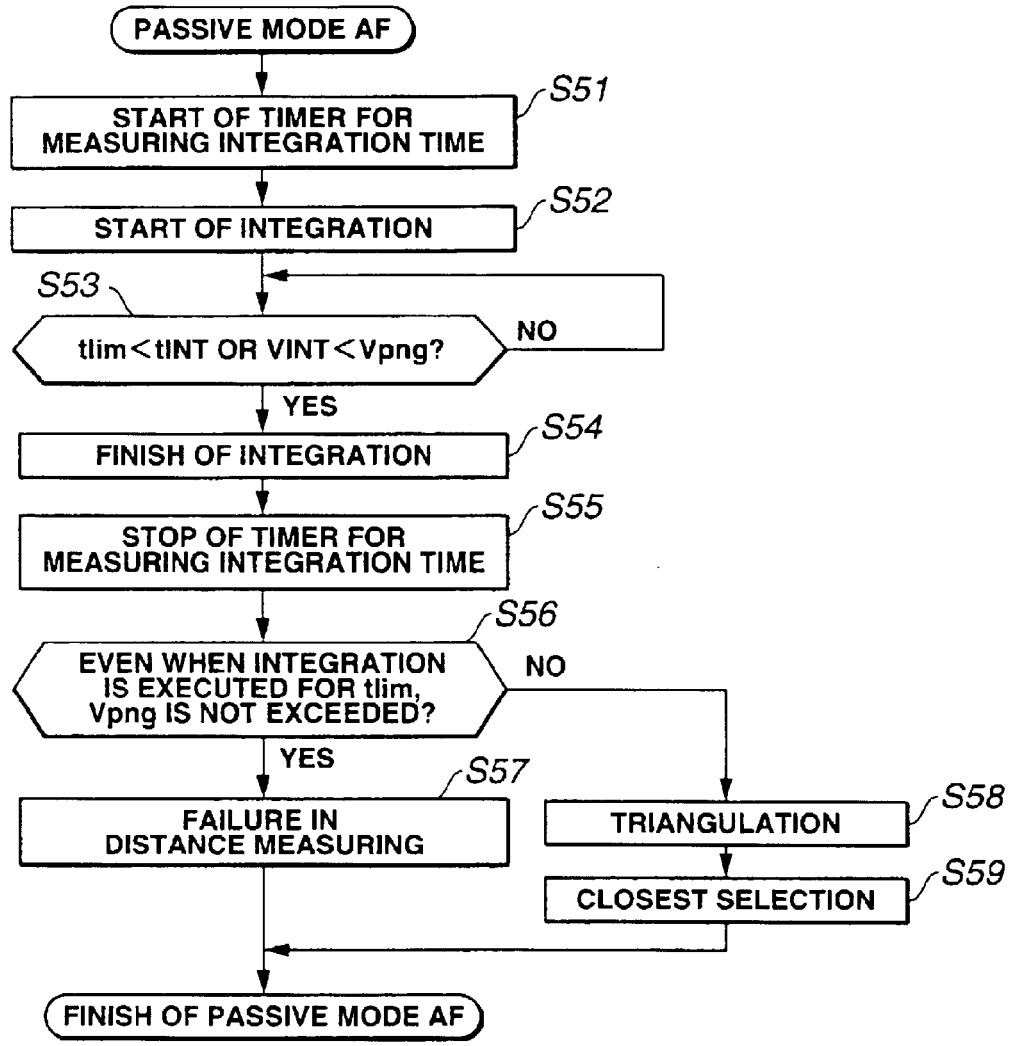
FIG. 10A is a flowchart illustrating an integration control of the camera according to the first embodiment when it is determined that a picture-taking scene is in a middle-level brightness or high-level brightness condition.

As shown in FIG. 10A, first of all, in Step S51, a timer (not shown) disposed in the CPU 1 (see FIG. 1) is started in order to measure an integration time. Since an excessively long integration time causes a release time lag and a risk that an operator misses picture-taking timing, in general, the integration time is given by a specified integration limit-time. That is, when the integration time exceeds the integration limit-time, the integration in the passive mode is finished at once. The integration limit-time is stored in the EEPROM 4 or the like. After the timer is started in Step S51, the process moves to Step S52.

Figure 10B:
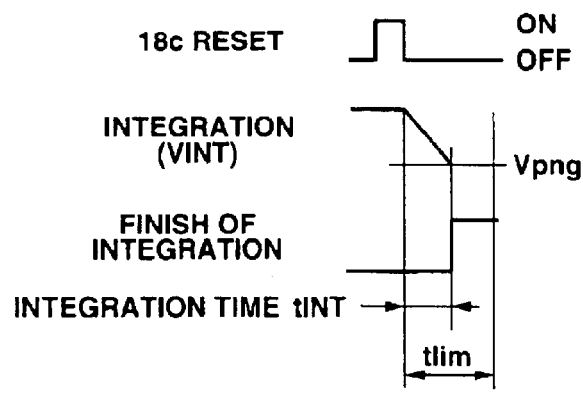
FIG. 10B is a timing chart illustrating the integration control of the camera according to the first embodiment when it is determined that the picture-taking scene is in a middle-level brightness or high-level brightness condition.

In Step S52, as shown in FIG. 10B, after the reset switch 18c (see FIG. 1) is temporarily turned on, the integration is started, and the process moves to Step S53.

It is determined in Step S53 whether or not the time tINT measured by the timer exceeds an integration limit-time tlim or whether or not the integrated voltage VINT becomes lower than the integration-finish voltage vpng stored in the EEPROM 4 or the like. The integration is executed until the tINT exceeds the integration limit-time tlim or the integrated voltage VINT becomes lower than the integration-finish voltage Vpng, and then the process moves to Step S54.

In the case where the integration is further continued even when the integrated voltage VINT becomes lower than the integration-finish voltage Vpng, the integrated voltage becomes saturated in the end, thereby making an image signal of the object and signals around the object indistinguishable from each other and resulting in inaccurate distance measuring. Accordingly, the integration is finished in Step S54, and the process moves to Step S55. In step S55, the timer for measuring an integration time is stopped, and the process moves to Step S56.

It is determined in Step S56 whether or not the integrated voltage VINT still remains higher than the integration-finish voltage vpng even when the integration time exceeds the integration limit-time tlim. When the integrated voltage VINT is higher than the integration-finish voltage Vpng, since a triangulation-possible image signal is not obtained, the process branches to Step S57, the distance-measuring failure determination is made, and the integration in the passive mode is finished.

Back to Step S56, when the integrated voltage VINT becomes lower than the integration-finish voltage vpng after the integration time exceeds the integration limit-time tlim, the process moves to Step S58, and the triangulation is performed. Then, in the subsequent Step S59, the closest selection for selecting a distance-measuring area outputting the closest distance-measured result among the plurality of distance-measuring areas is performed, and the integration in the passive mode is finished.

Next, a control of setting the distance-measuring range by the AF sensor 3 shown in step S3 in FIGS. 3A, 3B, and 7 is described with reference to a flowchart of a subroutine in FIG. 11.

Figure 11:
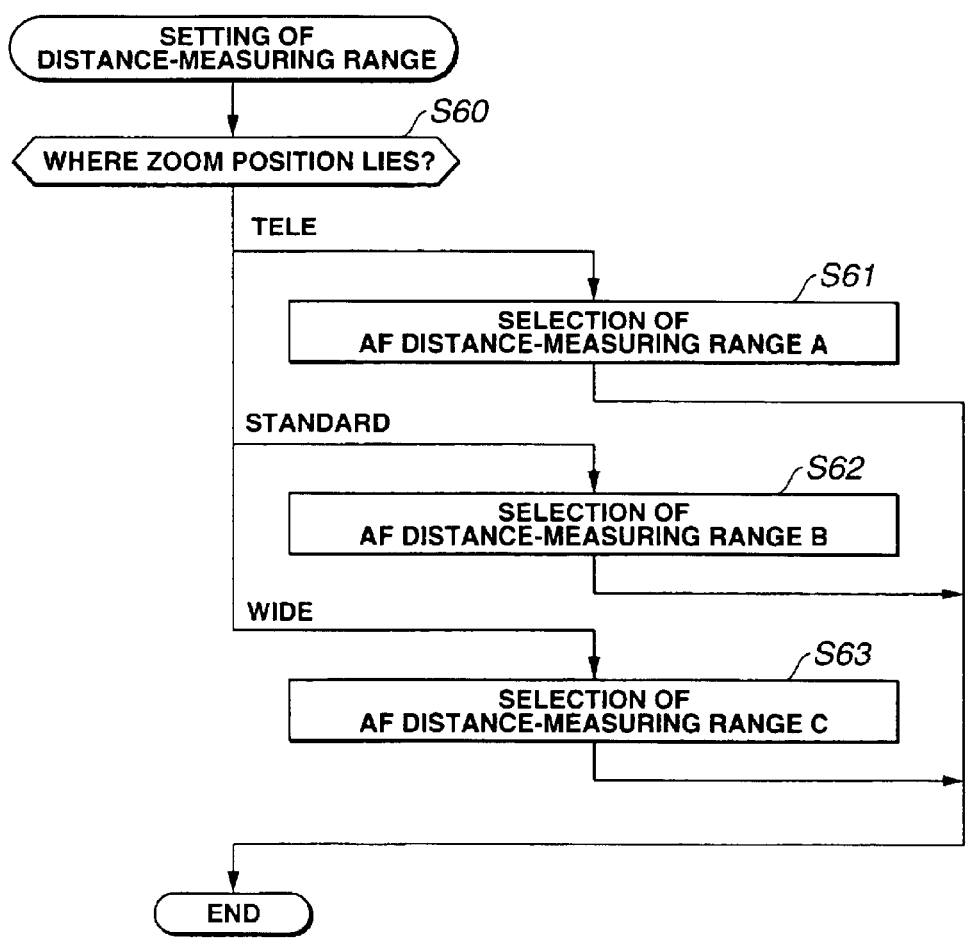
FIG. 11 is a flowchart illustrating a setting control of a distance-measuring range by the AF sensor of the camera according to the first embodiment.

As shown in FIG. 11, first of all, in Step S60, a present zoom position is determined on the basis of a detected result by the zoom position detecting unit 17 (see FIG. 1). When it is determined that the present zoom position lies in the vicinity of TELE, the process moves to Step S61, and the distance-measuring range A (see FIGS. 3A and 3B) is selected. Also, when it is determined that the present zoom position lies in the vicinity of STANDARD, the process moves to Step S62, and the distance-measuring range B (see FIGS. 3A and 3B) is selected. In addition, when it is determined that the present zoom position lies in the vicinity of WIDE, the process jumps to Step S63, and the distance-measuring range C (see FIGS. 3A and 3B) is selected.

Subsequently, the 1/L averaging process shown in Step S8 in FIGS. 6A, 6B, and 7 will be described with reference to a flowchart of a subroutine in FIG. 12.

Figure 12:
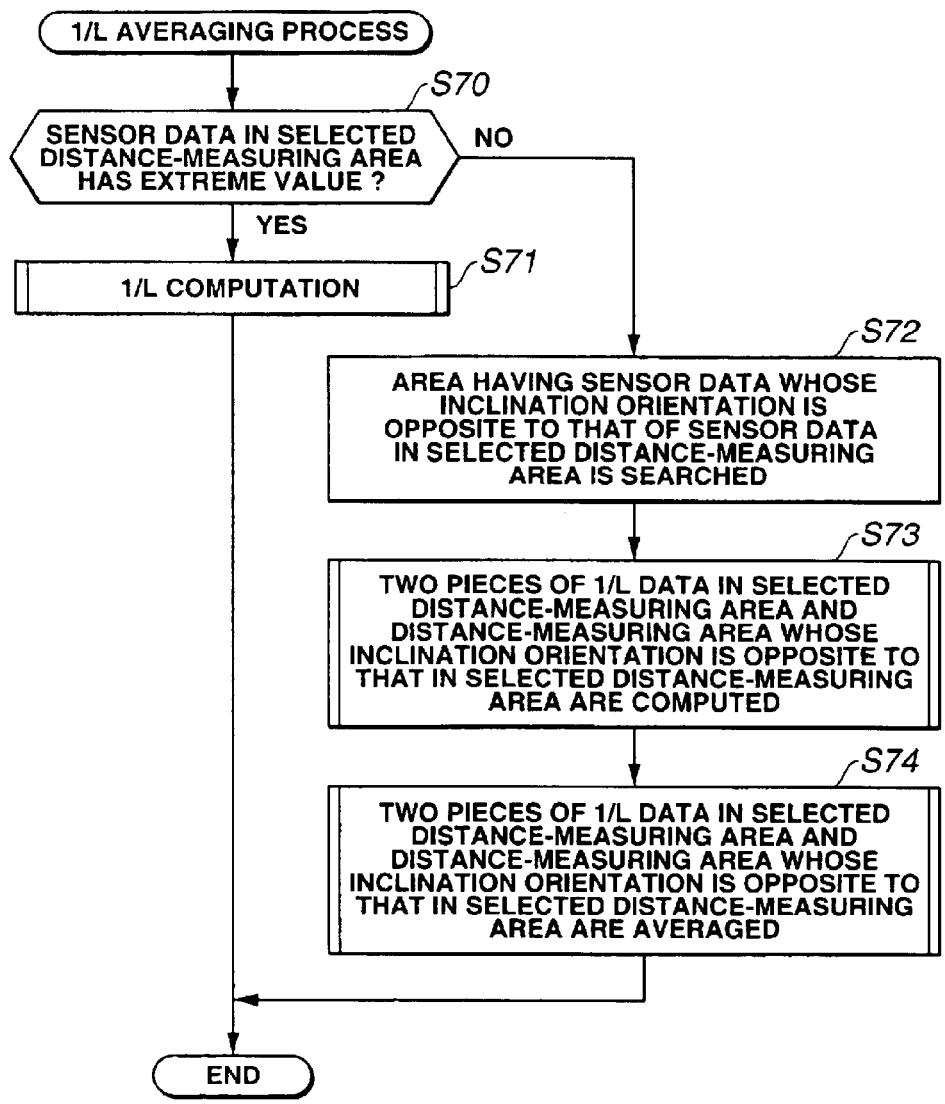
FIG. 12 is a flowchart illustrating a control of a 1/L averaging process of the camera according to the first embodiment.

As shown in FIG. 12, first of all, it is determined in Step S12 whether or not the sensor data of the selected distance-measuring area has an extreme value. With an extreme value, the process moves to Step S71, the 1/L is computed, and then the process returns. Without an extreme value, the process branches to Step S72.

In Step S72, a distance-measuring area having sensor data whose inclination orientation is opposite to that of the sensor data in the selected distance-measuring area is searched for, and the process moves to Step S73. In Step S73, 1/L of the selected distance-measuring area and 1/L of the searched distance-measuring area whose inclination orientation is opposite to that of the selected distance-measuring area are computed, and the process moves to Step S74. Also, in Step S74, an average value of the two 1/Ls computed in Step S73 is computed, and then the process returns.

As described above, in the camera having a distance measuring apparatus according to the first embodiment, in the case where a picture-taking scene is a night scene or the like and when illumination of fill light is necessary in the event of performing AF distance measuring, an influence of the fill light reflected at the surface of the lens barrel 22 or at a highly reflective component disposed in the vicinity of the AF sensor 3 is curbed such that an area is selected among a plurality of distance-measuring areas for obtaining a distance-measured result, another area having sensor data whose inclination orientation is opposite to that of sensor data of the selected area, having an extreme value interposed therebetween, is searched for, and an average value of the reciprocals of distances of the selected area and the searched area having the opposite inclination orientation is computed.

When the above control is performed, the influence of the fill light reflected at the surface of the lens barrel 22 or at a highly reflective component disposed in the vicinity of the AF sensor 3 is prevented from causing an inaccurate distance-measured result and thus leading to an out-of-focus picture.

Figure 13:
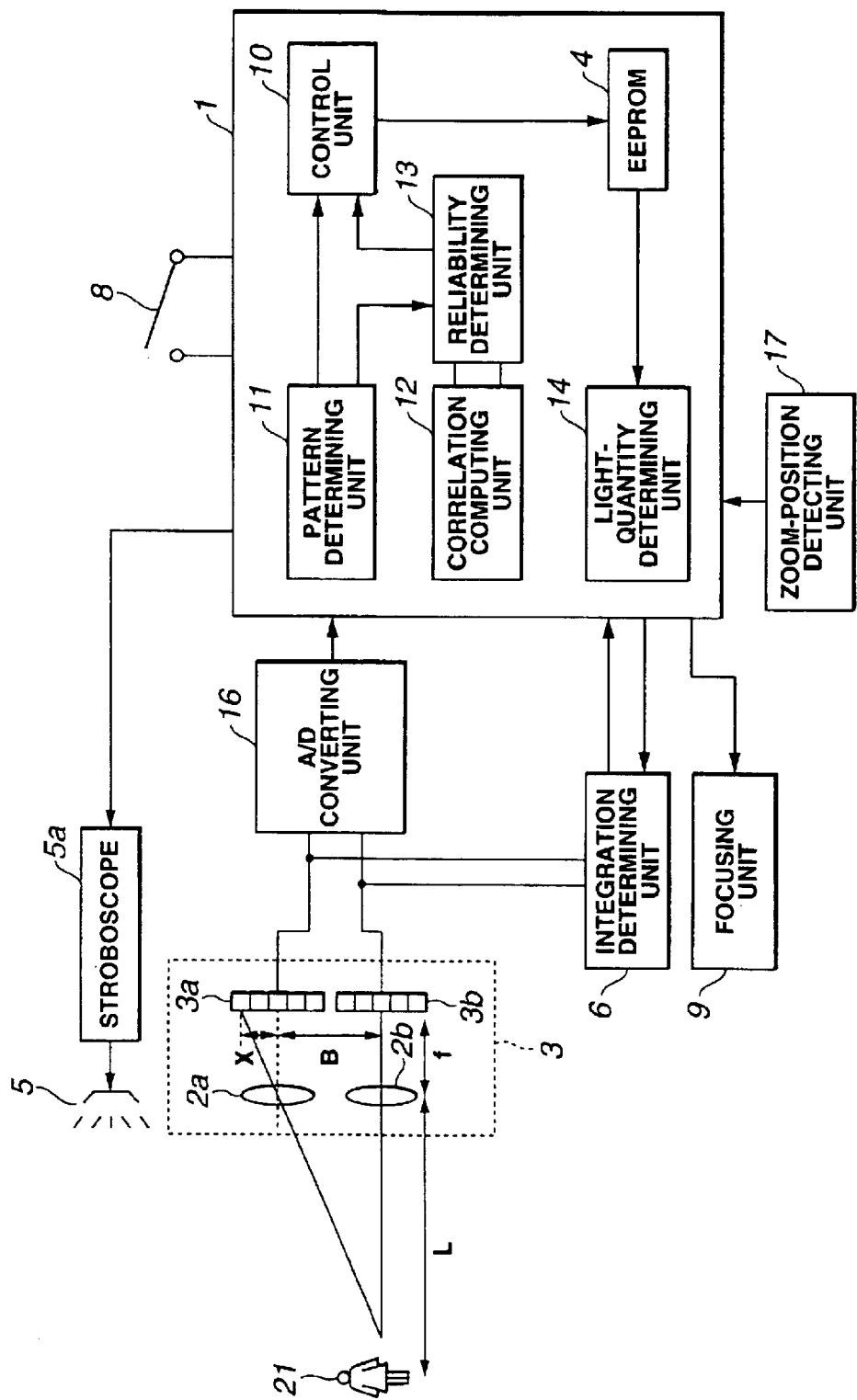
FIG. 13 is a block diagram illustrating an electrical circuit of a modification of the camera having a distance measuring apparatus according to the first embodiment.

Although, the camera having a distance measuring apparatus operable in two kinds of distance-measuring modes of the active and passive modes is exemplified in the first embodiment, even with a distance measuring in a modification shown in FIG. 13, which does not have the fixed-light removing unit 7, the influence of the fill light can be curbed in the same fashion as in the above-described embodiment such that an area is selected among a plurality of distance-measuring areas for obtaining a distance-measured result, another area having sensor data whose inclination orientation is opposite to that of sensor data of the selected area, having an extreme value interposed therebetween, is searched for, and an average value of the reciprocals of distances of the selected area and the searched area having the opposite inclination orientation is computed.

Next, a second embodiment of the present invention will be described.

Since a camera having a distance measuring apparatus according to the second embodiment of the present invention basically has the same structure as in the first embodiment, only different parts will be described below.

In both first and second embodiments of the present invention, when no extreme value exists in a range used for computing a distance of sensor data, a second distance-measuring area different from an initially-selected first distance-measuring area is selected.

In particular, the present embodiment is achieved by utilizing a feature as follows: In the case where the sensor data of the sensor array 3a is deformed (its integration is advanced as a whole) due to the flare-like glistening of the front panel 20 (see FIG. 4) as shown in FIG. 5C, further if no extreme value exists in a selected distance-measuring area and its distance-measured results are shifted to the long distance side, distance-measured results in another distance-measuring area having no extreme value and whose inclination orientation is opposite to that of the selected distance-measuring area whose distance-measured result is shifted to the long distance side are shifted to the short distance side.

To be more specific, as shown in FIG. 6A, an integration of the whole sensor data of the sensor array 3a is advanced due to an influence of the above-described fill light. Concerning the sensor data shown in FIG. 6A, when the reciprocal 1/L (1) of its distance is computed by computing its correlation with respect to the selected distance-measuring area, it is shifted to the long distance side if no correction is applied.

Hence, according to the second embodiment, distance-measured results are prevented from being shifted to the long distance side by the following method.

That is, a distance-measuring area having sensor data whose average value is closest to that of other sensor data of a selected distance-measuring area is searched for, and 1/L (2) of the searched distance-measuring area having the sensor data whose average value is closest to that of the other sensor data of the distance-measuring area is computed. By computing an average value of the 1/L (1) and 1/L (2) as described above, the distance-measured results are prevented from being shifted to the long distance side. Meanwhile, the distance-measuring area having the sensor data whose average value is closest to the other sensor data of the selected distance-measuring area is searched for toward a minimal value.

Also, the 1/L averaging process in Step S8 shown in FIG. 7 in the second embodiment is different from that in the first embodiment. A process down to the 1/L averaging process will be described below with reference to FIG. 7.

In the second embodiment, in the same fashion as in the first embodiment, it is determined in Step S5 whether or not the distance measuring performed in the active mode in Step S4 is succeeded. When the distance measuring in the active mode is succeeded, the process moves to Step S7. When failed, the process branches to Step S6, the distance measuring is performed with an AF computation of a quantity of reflected light, and then the distance measuring is finished. When the distance measuring is succeeded, in the second embodiment, it is determined in Step S7 whether or not the number of fill-light flashing times is not less than a predetermined number of times or a difference in the average values of the sensor data of the pair of sensor arrays 3a and 3b is not less than a predetermined value. When either one is not less than the corresponding predetermined value, the process moves to Step S8. In Step S8, a second distance-measuring area having sensor data whose average value is closest to that of the sensor data in the first distance-measuring area selected in Step S4 is searched for, 1/L (2) of the searched distance-measuring area is computed, the above-described 1/L averaging process (see FIGS. 6A and 12) of computing an average value of 1/L (1) of the first distance-measuring area selected in Step 54 and 1/L (2) of the second distance-measuring area is conducted, and the distance measuring is finished. When both are less than the corresponding predetermined values, the process branches to Step S18, 1/L of the distance-measuring areas is computed in Step S18 with the known closest selection, and the distance measuring is finished.

Since other operations in the second embodiment are the same as those in the first embodiment, their description is omitted.

Meanwhile, other embodiments formed by, for example, combining parts of the above-described embodiments fall in the scope of the present invention.

In this invention, it is apparent that working modes different in a wide range can be formed on this basis of this invention without departing from the spirit and scope of the invention. This invention is not restricted by any specific embodiment except being limited by the appended claims.

What is claimed is:

1. A camera having a distance measuring apparatus which performs distance measuring of a plurality of distance-measuring areas in a photographing plane, comprising:

photo-receiving lenses, each forming an object image;

a photo receiving unit receiving the object images formed by the photo-receiving lenses;

a computing unit computing data about object-to-camera distances on the plurality of distance-measuring areas on the basis of outputs of the photo receiving unit;

a selecting unit selecting any one of the distance-measuring areas in the photographing plane on the basis of the computed results of the computing unit; and a determining unit determining whether or not an extreme value exists in outputs of the photo receiving unit, in the distance-measuring area selected by the selecting unit, wherein, when the determining unit determines that the extreme value does not exist, the selecting unit selects a second distance-measuring area different from the initially-selected first distance-measuring area.

2. The camera having a distance measuring apparatus according to claim 1, wherein the selecting unit selects a second distance-measuring area having outputs whose inclination orientation is opposite to that of the outputs from the photo receiving unit in the initially-selected first distance-measuring area.

3. The camera having a distance measuring apparatus according to claim 1, wherein the selecting unit selects a second distance-measuring area having the average value of the outputs in the initially-selected first distance-measuring area.

4. A camera having a distance measuring apparatus which performs distance measuring of a plurality of distance-measuring areas in a photographing plane, comprising:

photo-receiving lenses, each forming an object image;

a photo receiving unit receiving the object images formed by the photo-receiving lenses;

a computing unit computing data about object-to-camera distances of the plurality of distance-measuring areas on the basis of outputs of the photo receiving unit;

a selecting unit selecting any one of the distance-measuring areas in the photographing plane on the basis of the computed results of the computing unit;

a determining unit determining whether or not an extreme value exists in outputs of the photo receiving unit, in the distance-measuring area selected by the selecting unit, and a focusing unit adjusting the focus of a photographing optical system, wherein, when the determining unit determines that the extreme value does not exist, the selecting unit selects a second distance-measuring area having outputs whose inclination orientation is opposite to that of the outputs from the photo receiving unit in the initially-selected first distance-measuring area.

5. The camera having a distance measuring apparatus according to claim 4, wherein the computing unit computes an average value of the data about camera-to-object distances in the first and second distance-measuring areas selected by the selecting unit.

6. The camera having a distance measuring apparatus according to claim 5, further comprising a projecting unit projecting a light beam toward an object, wherein the computing unit computes the average value when the number of projecting times of the projecting unit is not less than a predetermined number of times.

7. The camera having a distance measuring apparatus according to claim 6, wherein the photo receiving unit constitutes a pair of line sensors, and wherein, when a difference in average values of outputs of the pair of line sensors is not less than a predetermined value, the computing unit computes the average values.

8. The camera having a distance measuring apparatus according to claim 5, wherein the focusing unit adjusts the focus of the photographing optical system on the basis of the average value.

9. The camera having a distance measuring apparatus according to claim 4, wherein, in the event where the selecting unit selects the second distance-measuring area, when there is a plurality of outputs, having the opposite inclination orientation, from the photo receiving unit, a distance-measuring area which has outputs having the opposite inclination orientation and which lies closest to the first distance-measuring area is selected.

10. The camera having a distance measuring apparatus according to claim 4, further comprising a searching unit searching for outputs whose inclination orientation is opposite to that of the outputs from the photo receiving unit in the first distance-measuring area, wherein the searching unit preferentially searches, from the photo receiving unit, for outputs in a distance-measuring area lying in a direction along which the extreme value exists, when viewed from the first distance-measuring area.

11. The camera having a distance measuring apparatus according to claim 6, further comprising a brightness-determining unit determining whether or not at least a part of the region in the photographing plane is in a low-level brightness condition, on the basis of outputs from the receiving unit when the projecting unit is in a non-projecting mode.

12. The camera having a distance measuring apparatus according to claim 11, wherein, when the brightness determining unit determines that the part of the region is in a low-level brightness condition, the projecting unit projects a light beam toward an object.

13. The camera having a distance measuring apparatus according to claim 11, wherein, when the brightness determining unit determines that the part of the region is in a high-level brightness condition, distance measuring is performed with a light beam not being projected by the projecting unit.

14. The camera having a distance measuring apparatus according to claim 6, wherein the projecting unit flashes stroboscopic light toward an object.

15. A camera having a distance measuring apparatus which performs distance measuring of a plurality of distance-measuring areas in a photographing plane, comprising:

photo-receiving lenses, each forming an object image;

a photo receiving unit receiving the object images formed by the photo-receiving lenses;

a computing unit computing data about object-to-camera distances in the plurality of distance-measuring areas on the basis of outputs of the photo receiving unit;

a selecting unit selecting any one of the distance-measuring areas in the photographing plane on the basis of the computed results of the computing unit;

a determining unit determining whether or not an extreme value exists in outputs of the photo receiving unit, in the distance-measuring area selected by the selecting unit, and a focusing unit adjusting the focus of a photographing optical system, wherein, when the determining unit determines that the extreme value does not exist, the selecting unit selects a second distance-measuring area having outputs whose average value is closest to that of the outputs from the photo receiving unit in the initially-selected first distance-measuring area.

16. The camera having a distance measuring apparatus according to claim 15, wherein the computing unit computes an average value of data about object-to-camera distances in the first and second distance-measuring areas selected by the selecting unit.

17. The camera having a distance measuring apparatus according to claim 16, further comprising a projecting unit projecting a light beam toward an object, wherein, when the number of projecting times of the projecting unit is not less than a predetermined number of times, the computing unit computes the average value.

18. The camera having a distance measuring apparatus according to claim 16, wherein the photo receiving unit constitutes a pair of line sensors, and wherein, when a difference in average values of outputs of the pair of line sensors is not less than a predetermined value, the computing unit computes the average values.

19. The camera having a distance measuring apparatus according to claim 16, wherein the focusing unit adjusts the focus of the photographing optical system on the basis of the average value.

20. The camera having a distance measuring apparatus according to claim 15, wherein, in the event where the selecting unit selects the second distance-measuring area, when there is a plurality of outputs having the opposite inclination orientation, from the photo receiving unit, a distance-measuring area which has outputs having the opposite inclination orientation and which lies closest to the first distance-measuring area is selected.

21. The camera having a distance measuring apparatus according to claim 15, further comprising a searching unit searching for outputs whose inclination orientation is opposite to that of the outputs from the photo receiving unit in the first distance-measuring area, wherein the searching unit preferentially searches, from the photo receiving unit, for outputs in a distance-measuring area lying in a direction along which the extreme value exist, when viewed from the first distance-measuring area.

22. The camera having a distance measuring apparatus according to claim 17, further comprising a brightness-determining unit determining whether or not at least a part of the region in the photographing plane is in a low-level brightness condition, on the basis of outputs from the receiving unit when-the projecting unit is in a non-projecting mode.

23. The camera having a distance measuring apparatus according to claim 22, wherein, when the brightness determining unit determines that the part of the region is in a low-level brightness condition, the projecting unit projects a light beam toward an object.

24. The camera having a distance measuring apparatus according to claim 22, wherein, when the brightness determining unit determines that the part of the region is in a high-level brightness condition, distance measuring is performed with a light beam not being projected by the projecting unit.

25. The camera having a distance measuring apparatus according to claim 17, wherein the projecting unit flashes stroboscopic light toward an object.

* * * * *